US011529673B2

(12) United States Patent
Jattke et al.

(10) Patent No.: US 11,529,673 B2
(45) Date of Patent: Dec. 20, 2022

(54) COATING COMPOSITION FOR THE FOUNDRY INDUSTRY, CONTAINING PARTICULATE, AMORPHOUS SILICON DIOXIDE AND ACID

(71) Applicant: HÜTTENES-ALBERTUS CHEMISCHE WERKE GESELLSCHAFT MIT BESCHRÄNKTER HAFTUNG, Düsseldorf (DE)

(72) Inventors: Andreas Jattke, Hannover (DE); Christian Lustig, Düsseldorf (DE); Sabrina Maria Anderten, Isernhagen (DE); Klaus Seeger, Hannover (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 8 days.

(21) Appl. No.: 16/475,769

(22) PCT Filed: Dec. 20, 2017

(86) PCT No.: PCT/EP2017/083745
§ 371 (c)(1),
(2) Date: Jul. 3, 2019

(87) PCT Pub. No.: WO2018/127413
PCT Pub. Date: Jul. 12, 2018

(65) Prior Publication Data
US 2020/0001354 A1 Jan. 2, 2020

(30) Foreign Application Priority Data

Jan. 4, 2017 (DE) .......................... 102017100112.3
Apr. 10, 2017 (DE) .......................... 102017107658.1

(51) Int. Cl.
| | |
|---|---|
| *C04B 35/195* | (2006.01) |
| *C04B 35/14* | (2006.01) |
| *B22C 9/12* | (2006.01) |
| *B22C 9/10* | (2006.01) |
| *C04B 35/48* | (2006.01) |
| *C04B 35/622* | (2006.01) |
| *C04B 35/632* | (2006.01) |
| *C04B 35/634* | (2006.01) |
| *C04B 41/00* | (2006.01) |
| *C04B 41/50* | (2006.01) |
| *C04B 41/68* | (2006.01) |
| *C08K 3/36* | (2006.01) |

(52) U.S. Cl.
CPC .................. *B22C 9/12* (2013.01); *B22C 9/10* (2013.01); *C04B 35/195* (2013.01); *C04B 35/481* (2013.01); *C04B 35/62222* (2013.01); *C04B 35/632* (2013.01); *C04B 35/63416* (2013.01); *C04B 41/009* (2013.01); *C04B 41/5024* (2013.01); *C04B 41/68* (2013.01); *C08K 3/36* (2013.01); *C04B 2235/3248* (2013.01); *C04B 2235/3418* (2013.01); *C04B 2235/3481* (2013.01); *C04B 2235/425* (2013.01); *C04B 2235/9676* (2013.01)

(58) Field of Classification Search
CPC ... C04B 35/195; C04B 35/481; C04B 35/632; C04B 41/009; C04B 41/68; B29C 9/12; B29C 9/10
See application file for complete search history.

(56) References Cited

U.S. PATENT DOCUMENTS

| | | | |
|---|---|---|---|
| 3,357,481 A | | 12/1967 | Snyder |
| 3,852,085 A | * | 12/1974 | Vurlicer .................. C04B 35/14 524/45 |
| 5,474,606 A | | 12/1995 | Twardowska et al. |
| 5,582,232 A | | 12/1996 | Bambauer et al. |
| 6,972,059 B1 | | 12/2005 | Skerdi |

(Continued)

FOREIGN PATENT DOCUMENTS

| | | | | |
|---|---|---|---|---|
| BE | 829458 A | * | 11/1975 | ............... B22C 3/00 |
| CN | 1065612 | | 10/1992 | |

(Continued)

OTHER PUBLICATIONS

Matje et al. "DE 102006040385 A1, machine translation", published Jan. 18, 2007 (Year: 2007).*

(Continued)

*Primary Examiner* — Alex B Efta
(74) *Attorney, Agent, or Firm* — Duane Morris LLP; Gregory M. Lefkowitz; Brandon A. Chan

(57) ABSTRACT

A coating composition is described, for use in the foundry, in particular comprising particulate, amorphous silicon dioxide ($SiO_2$) and an aqueous phase having a pH of at most 5, and also coated, waterglass-bound foundry molding elements, especially coated, waterglass-bound foundry molds and foundry cores, which each comprise a coating composition of the invention. Further described is the use of a coating composition of the invention for producing a coating on a waterglass-bound foundry molding element and a method for producing a waterglass-bound foundry molding element (mold or core) coated with a water-containing refractory coating. Likewise specified is a kit whose contents include a coating composition of the invention.

9 Claims, No Drawings

(56) References Cited

U.S. PATENT DOCUMENTS

| | | | |
|---|---|---|---|
| 7,022,178 | B1 | 4/2006 | Steinhauser |
| 7,770,629 | B2 | 8/2010 | Weicker et al. |
| 8,919,421 | B2 * | 12/2014 | Frohn ................... B22C 1/2253 164/23 |
| 2007/0054057 | A1 | 3/2007 | Matje et al. |
| 2009/0095439 | A1 | 4/2009 | Stotzel et al. |
| 2009/0218066 | A1 | 9/2009 | Stotzel et al. |
| 2010/0029463 | A1 | 2/2010 | Lipinski |
| 2010/0326620 | A1 | 12/2010 | Muller et al. |
| 2014/0242269 | A1 * | 8/2014 | Kloskowski .............. B22C 9/12 427/134 |
| 2014/0352910 | A1 | 12/2014 | Kloskowski et al. |
| 2016/0129496 | A1 * | 5/2016 | Stotzel ..................... B22C 9/10 164/14 |
| 2016/0136724 | A1 | 5/2016 | Deters |

FOREIGN PATENT DOCUMENTS

| | | | |
|---|---|---|---|
| CN | 105537514 | | 5/2016 |
| DE | 10339676 | | 3/2005 |
| DE | 102006040385 | | 1/2007 |
| DE | 102006040385 A1 * | 1/2007 | ........... C04B 41/009 |
| EP | 1486743 | | 12/2004 |
| GB | 782205 | | 9/1957 |
| JP | S5519415 | | 2/1980 |
| JP | S5519415 A * | 12/1980 | |
| JP | S57175046 | | 10/1982 |
| JP | 200729969 A * | 8/2007 | |
| JP | 2013094834 | | 5/2013 |
| KR | 20040021219 | | 3/2004 |
| WO | 0005010 | | 2/2000 |
| WO | 2013044904 | | 4/2013 |

OTHER PUBLICATIONS

Kasperowski, A., et al., "Steuerung der Prozessstabilität bei der anorganische Kernfertigung (Control of process stability in inorganic core production)," Giesserei, Dec. 2010, vol. 97, pp. 58-61.

* cited by examiner

COATING COMPOSITION FOR THE FOUNDRY INDUSTRY, CONTAINING PARTICULATE, AMORPHOUS SILICON DIOXIDE AND ACID

CROSS-REFERENCE TO RELATED APPLICATIONS

This application is a § 371 national stage entry of International Application No. PCT/EP2017/083745, filed on Dec. 20, 2017, which claims priority to German Patent Application No. 102017100112.3, filed on Jan. 4, 2017, and German Patent Application No. 102017107658.1, filed on Apr. 10, 2017, the entire contents of which are incorporated herein by reference.

The present invention relates to a coating composition for use in the foundry, in particular comprising particulate, amorphous silicon dioxide ($SiO_2$) and an aqueous phase having a pH of at most 5, preferably at most 4, and also to coated, waterglass-bound foundry molding elements, especially coated, waterglass-bound foundry molds and foundry cores, which each comprise a coating composition of the invention. The invention further relates to the use of a coating composition of the invention for producing a coating on a waterglass-bound foundry molding element and to a method for producing a waterglass-bound foundry molding element (mold or core) coated with a water-containing refractory coating. The invention likewise relates to a kit whose contents include a coating composition of the invention. The invention is defined in the appended claims.

Casting in an expendable mold is a widespread method for producing near-net-shape components, particularly in metal casting. After casting, the mold is destroyed and the casting is removed. Molds are negatives: they contain the cavity from which casting is to take place, producing the casting whose fabrication is intended. The inner contours of the future casting may be formed by cores. In the production of the mold, the cavity may be molded into the molding material by means of a model of the casting to be fabricated. Cores are usually molded in a separate core box.

Mold base materials used for foundry molds (for the purposes of the present invention also called "molds") and foundry cores (for the purposes of the present invention also called "cores") are predominantly granular refractory materials such as classified silica sand that has been washed. Further suitable mold base materials known per se are, for example, zircon sands, chromite sands, chamottes, olivine sands, feldspar-containing sands, and andalusite sands. A mold base material may also be a mixture of different mold base materials from among those stated, or of other preferred mold base materials. The refractory mold base material is preferably in a free-flowing form, allowing it to be introduced into a suitable cavity and compacted therein. The mold base material or the corresponding molding material mixture (molding material) is compacted in order to increase the strength of the foundry mold. To produce the foundry molds, the mold base materials are bound using organic or inorganic molding material binders (binders). The molding material binder generates a strong cohesion between the particles of the molding material, providing the foundry mold with the required mechanical stability. The production of molds and cores in industrial practice takes place generally and advantageously in shooting machines or molding machines, in which the particulate constituents are compacted and the binder is cured; this is also true of the molds and cores used in the context of the present invention.

Foundry molds may be produced using either organic or inorganic molding material binders, the curing of which may respectively take place by means of cold or hot processes. Cold processes as referred to by the skilled person are those which are carried out substantially at room temperature without heating of the foundry mold. The curing in this case is accomplished usually by a chemical reaction which is initiated, for example, by the passage of a catalyst gas, after shaping, through the molding material mixture to be cured, this mixture comprising the mold base material and the molding material binder. In the case of hot processes, the molding material mixture after shaping is heated to a temperature sufficiently high to drive out, for example the solvent present in the molding material binder, and/or to initiate a chemical reaction which cures the molding material binder, by crosslinking, for example.

A feature common to all organic molding material binders, irrespective of their curing mechanism, is that when liquid metal is introduced into the foundry mold, they undergo thermal decomposition and, in so doing, may release pollutants, such as, for example, benzene, toluene, xylenes, phenol, formaldehyde, and other products of thermolysis and/or cracking, some of which are unidentified. While various measures have brought success in minimizing these emissions, they nevertheless cannot be avoided completely at present in the case of organic molding material binders.

In order to minimize or prevent the emission of decomposition products during the casting procedure, molding material binders may be used which are based on inorganic materials and contain at most a very low fraction of organic compounds. Molding material binder systems of this kind have already been known for some considerable time, from, for example, the documents GB 782205 A, U.S. Pat. Nos. 6,972,059 B1, 5,582,232 A, 5,474,606 A, and 7,022,178.

The term "inorganic molding material binder" refers below to a molding material binder which consists very predominantly, preferably to an extent of more than 95 wt %, more preferably more than 99 wt %, and very preferably completely, of water and inorganic materials, so that the fraction of organic compounds in an inorganic molding material binder of this kind is preferably less than 5 wt %, more preferably less than 1 wt %, and very preferably 0 wt %.

The expression "inorganically bound" in the context of the present text means that a mold or a core has been bound with an inorganic molding material binder (as defined above).

Particularly important as a constituent of inorganic molding material binders is alkali metal waterglass. Alkali metal waterglass refers to vitreous, in other words amorphous, water-soluble sodium, potassium, and lithium silicates which have solidified from a melt, to mixtures thereof, and also to the corresponding aqueous solutions. The term "waterglass" below refers to those amorphous, water-soluble sodium, potassium and/or lithium silicates and/or their aqueous solutions and/or mixtures of the aforesaid silicates and/or their solutions that have in each case a molar modulus (molar ratio) of $SiO_2$ to $M_2O$ in the range from 1.6 to 4.0, preferably in the range from 1.8 to 2.5, where $M_2O$ denotes the total amount of lithium oxide, sodium oxide, and potassium oxide. The expression "waterglass-bound" means that a foundry molding element, more particularly a mold or a core, has been produced or is producible using a molding material binder which comprises waterglass or consists of waterglass. In the specification U.S. Pat. No. 7,770,629 B2, for example, a molding material mixture is proposed which as well as a refractory mold base material comprises a waterglass-based molding material binder and a particulate metal oxide, the particulate metal oxide used being preferably precipitated silica or fumed silica.

In comparison to organic molding material binders, however, inorganic molding material binders also have disadvantages. For example, foundry molds or cores produced using known inorganic molding material binders possess a comparatively low or lower stability toward atmospheric moisture and/or to water or aqueous moisture. It is therefore not possible reliably, for example, for such foundry molds or cores to be stored over a prolonged period of time, as is usual with organic molding material binders.

Particularly in the context of iron and steel casting, the surfaces of foundry molding elements, more particularly of molds and cores, are customarily coated with a coating called a "refractory coating", especially those surfaces which come into contact with cast metal. Refractory coatings here form a boundary layer or barrier layer between mold/core and metal, for the purposes, among others, of controlled suppression of defect mechanisms at these points, or for the utilization of metallurgical effects. Generally speaking, refractory coatings in foundry technology are intended in particular to fulfill the following functions known to the skilled person:

improving the smoothness of the surface of the casting;
maximizing separation of liquid metal and mold or core;
preventing chemical reactions between constituents of mold/core and melt, hence facilitating the separation between mold/core and casting; and/or
preventing surface defects on the casting, such as gas bubbles, penetrations, flash and/or scabs.

The above-stated and also, where appropriate, further functions are generally established and optimized, and/or adapted to the particular intended purpose, by means of the precise composition of the refractory coating or of the coating composition to be applied to the mold or the core.

Coating compositions for use in the foundry usually comprise or are composed of the following components: (i) one or more fine-particled refractories, i.e., finely particulate, refractory or highly refractory inorganic materials, (ii) a carrier liquid comprising one or more compounds (water, alcohols, etc.), and (iii) as further constituents, for example, one or more refractory coating binders (hereinafter also called "binders" for short) and/or biocides and/or wetting agents and/or rheological additives. Ready-to-use coating compositions for the coating of molds and cores, accordingly, are usually suspensions of finely particulate, refractory or highly refractory inorganic materials (refractories) in a carrier fluid, e.g., in an aqueous (i.e., water-containing) carrier liquid or a nonaqueous (i.e., water-free) carrier liquid; for details in relation to the carrier liquid, see later on below.

The refractory coating or the coating composition is applied to the inner contour of the casting mold or to the core by means of a suitable application process, such as spraying, dipping, flow coating or spreading, for example, and dried thereon to give a coating on the basis of a refractory coating, or refractory coating film. The coating on the basis of a refractory coating may be dried by supply of heat or radiant energy, such as by microwave radiation, for example, or by drying in the ambient air. In the case of coating compositions which include combustible compounds in the carrier liquid, the drying may also take place by the burning off of these compounds.

The term "refractory" in the present text and in line with the usual understanding of a skilled person is used to refer to compositions, materials, and minerals which are able to withstand, at least for a short time, the temperature exposure involved in the casting or in the solidification of an iron melt, usually cast iron. Compositions, materials, and minerals referred to as "highly refractory" are those which are able briefly to withstand the casting heat of a steel melt. The temperatures which may arise during casting of steel melts are usually higher than the temperatures which may arise during the casting of iron or cast iron melts. Refractory compositions, materials, and minerals (refractories) and highly refractory compositions, materials, and minerals are known to the skilled person, from DIN 51060:2000-06, for example.

Refractories used in coating compositions are customarily mineral oxides, silicates or clay minerals. Examples of refractories also suitable in the context of the present invention are quartz (silicon dioxide), aluminum oxide, zirconium dioxide, aluminum silicates, phyllosilicates, zirconium silicates, olivine, talc, mica, graphite, coke, feldspar, diatomite, kaolins, calcined kaolins, metakaolinite, iron oxide, chromite, and bauxite, which may each be used individually or in any desired combinations with one another. The refractory serves, among other things, to seal the pores in a foundry mold or a core with respect to the penetration of the liquid metal. Moreover, the refractory produces a thermal insulation between foundry mold or core and liquid metal. The refractory is provided usually in powder form. Unless otherwise indicated, refractories in powder form in that case have a mean particle size (preferably measured by light scattering according to ISO 13320:2009-10) in the range from 0.1 to 500 µm, preferably in the range from 1 to 200 µm. Particularly suitable as refractories are materials which have melting points which lie at least 200° C. above the temperature of the particular metal melt used and/or which do not enter into any reaction with the metal melt.

The refractories are usually dispersed in a carrier liquid. The carrier liquid is a constituent or the constituent of a coating composition which is preferably in liquid form under standard conditions (20° C. and 1013.25 hPa) and/or is vaporizable at 160° C. and standard pressure (1013.25 hPa). Preferred carrier liquids, which are also suitable in the context of the present invention, are selected from the group consisting of water and organic carrier liquids and also mixtures thereof with one another and/or with further constituents. Suitable organic carrier liquids are preferably alcohols, including polyalcohols and polyether alcohols. Preferred alcohols are ethanol, n-propanol, isopropanol (2-propanol), n-butanol, and glycol. Water and aqueous mixtures (including aqueous solutions) are frequently preferred as carrier liquid.

The primary purpose of refractory coating binders (binders) is to fix the refractories present in a coating composition on the molding material. Examples of binders which are also suitable in the context of the present invention are synthetic resins (organic polymers) or dispersions of synthetic resins such as polyvinyl alcohols, polyacrylates, polyvinyl acetates and/or corresponding copolymers of the aforesaid polymers. Polyvinyl alcohols are preferred. Also suitable as binders are natural resins, dextrins, starches, and peptides.

Biocides prevent bacterial infestation. Examples of biocides also suitable in the context of the present invention are formaldehyde, 2-methyl-4-isothiazolin-3-one (MIT), 5-chloro-2-methyl-4-isothiazolin-3-one (CIT), and 1,2-benzisothiazolin-3-one (BIT). The biocides, preferably the stated individual biocides, are used customarily in a total amount of 10 to 1000 ppm, preferably in an amount of 50 to 500 ppm, based in each case on the total mass of the ready-to-use coating composition (which is intended for direct application to a casting mold or a core).

Rheological additives (standardizers) are used in order to set the refractory coating fluidity desired for processing. Inorganic standardizers also suitable in the context of the present invention are, for example, swellable clays, such as sodium bentonite or attapulgite (palygorskite), for example.

Examples of organic standardizers also suitable in the context of the present invention include swellable polymers, such as cellulose derivatives, more particularly carboxymethyl-, methyl-, ethyl-, hydroxyethyl-, and hydroxypropylcellulose, plant mucilages, polyvinylpyrrolidone, pectin, gelatin, agar-agar, polypeptides and/or alginates. The aforesaid rheological additives or standardizers are preferred ingredients of the coating composition of the invention.

Particularly in the case of coating compositions which are aqueous (i.e., which comprise water as carrier liquid or a constituent of the carrier liquid), moreover, it is possible to use wetting agents, in order to achieve more effective wetting of the molding material. The skilled person is aware of ionic and nonionic wetting agents. Ionic wetting agents used, for example, are dioctylsulfosuccinates, and nonionic wetting agents used are, for example, alkynediols or ethoxylated alkynediols. The aforesaid wetting agents are also preferred ingredients of the aqueous coating composition of the invention.

A coating composition may further comprise defoamers, pigments and/or dyes. Defoamers used may be, for example, silicone oil or mineral oil. Examples of pigments are red and yellow iron oxide and also graphite. Examples of dyes are commercial dyes known to the skilled person. The aforesaid defoamers, pigments and/or dyes are also preferred ingredients of the coating composition of the invention.

In order to be able to meet the rising requirements in the area of environmental and emissions protection, inorganic molding material binders, especially waterglass-containing molding material binders, ought in the future to gain in importance for the fabrication of molds and cores in the sector of the casting of iron and steel as well. To achieve the desired or necessary casting quality, it is usually necessary or advantageous, as indicated above, to coat inorganically bound molds and cores with a refractory coating. In the interest of environmental and emissions protection, therefore, it is logically also worthwhile when selecting the refractory coating to shun as far as possible the use of organic carrier liquids and to employ preferably water-based refractory coatings, i.e., refractory coatings with water as sole carrier liquid or as at least the predominant fraction of the carrier liquid.

As indicated above, however, foundry molding elements, especially molds and cores, which have been produced using inorganic molding material binders, more particularly using waterglass-containing molding material binders, possess a low stability toward exposure to water or aqueous moisture. The water present in water-based coating compositions may therefore damage the inorganically bound molds and cores which are treated (coated) with them. As a result, in particular, the strength of the molds and cores thus coated may be deleteriously diminished. This particular problem which is known in foundry technology (cf., e.g., WO 00/05010A1), has to date been countered only inadequately with existing means used, including, for example, particularly intensive curing of the molds and cores, costly and inconvenient processes for the drying of the applied refractory coating, or the adaptation of the molding material mixture.

The document WO 00/05010 specifies how it is possible for a coating based on water to be applied in particular to molds and cores that have been gassed with carbon dioxide and bound with sodium silicate when the coating composition employed comprises a water-soluble or water-miscible specific adjuvant.

The document WO 2013/044904 A1 specifies the possibility, through the combination of certain clays as ingredients of a water-containing refractory coating, of producing refractory coatings having an unusually high solids content but a viscosity, nevertheless, which is comparable with that of commercial ready-to-use refractory coatings, apparently enabling an improvement in the quality of the cores and molds bound with inorganic molding material binders and coated with these refractory coatings.

The documents DE 10 2011 115 025 A1 and WO 2013/050022 A2 specify the improvement in quality of the coated inorganic cores and molds when an aqueous coating composition is admixed with certain salts in a certain concentration range, and particularly the apparent boost to the storage stability of said cores and molds. The salts in question are salts of magnesium and/or manganese, especially their sulfates and chlorides.

The documents DE 10 2011 115 024 A1 and WO 2013/050023 A2 indicate that when certain additives are added to an aqueous coating composition the quality of the coated inorganic cores and molds is apparently improved, and particularly their storage stability boosted. Used as an additive constituent of the coating composition are esters of formic acid (methanoic acid), and the chain length of the alcohol or alcohol mixture used in the esterification is in particular on average less than six and more preferably less than three carbon atoms.

The document DE 10 2006 040 385 A1 discloses temperature-stable BN mold release layers based on ceramic and vitreous binders; the document, however, does not disclose use for inorganically bound molds or cores (based on corresponding particulate mold base materials) for use in the foundry.

For the priority application to the present application, the German Patent and Trademark Office searched the following prior art: DE 10 2006 040 385 A1, DE 10 2006 002 246 A1, DE 10 2005 041 863 A1, and DE 15 08 913 A.

As our own investigations have shown, however, the problems identified above still exist to a relevant extent even in the case of a procedure according to the stated prior art.

Starting out from the prior art, therefore, there is a need for further-improved coating compositions for use in the foundry which are intended to have or to enable one or more, preferably all, of the following advantageous properties:

the strength of the coated molds and/or cores producible therewith is to be increased relative to molds and cores coated with known water-containing refractory coatings or coating compositions, especially where the molds and cores have been produced with inorganic molding material binders, more particularly with waterglass-containing molding material binders;

the storage stability and also the resistance to atmospheric moisture of the coated molds and/or cores producible therewith is to be increased relative to molds and/or cores coated with known water-containing refractory coatings or coating compositions;

the storage stability of the coating composition itself is to not be significantly impaired, or even to be boosted, relative to known water-containing coating compositions;

the application of the coating composition to hot molds and/or cores (i.e., in particular, to those molds and/or cores which have temperatures of more than 50° C., preferably temperatures in the range from 50 to 100° C.) is to be made possible or at least improved;

the coated molds and cores producible therewith are to enable a high, preferably a defect-free casting quality, more preferably a defect-free casting quality and/or smoothness of the surface of the casting;

the use of inorganically bound, especially waterglass-bound, foundry molding elements, especially molds and/or cores, is to be made possible for the casting of iron and/or steel as well, or the possibility of use for these purposes is to be extended.

It was generally an object of the present invention to specify a coating composition for use in the foundry that possesses or enables one or more or all of the properties stated above.

It was a primary object of the present invention here to develop a coating composition for use in the foundry that can be used on inorganically bound, more particularly waterglass-bound, foundry molding elements, preferably molds and/or cores, without adversely affecting their properties, in particular their strengths.

A further object of the present object was to provide coated inorganically bound foundry molding elements, especially foundry molds and/or foundry cores, which in each case comprise a coating composition to be specified in accordance with the invention.

A further object of the present invention was to provide a corresponding process for producing an inorganically bound foundry molding element coated with a water-containing refractory coating.

An object of the present invention, moreover, was to provide a kit whose contents include a coating composition specified in accordance with the invention.

The invention is more closely defined or described in the appended claims, including particularly preferred combinations of preferred parameters, properties, and constituents of the invention. Specific and/or preferred embodiments of the invention are described with more precision hereinafter. Unless otherwise indicated, preferred aspects or embodiments of the invention can be combined with other aspects or embodiments of the invention, in particular with other preferred aspects or embodiments. The combination of respectively preferred aspects or embodiments with one another again in each case produces preferred aspects or embodiments of the invention. Embodiments, aspects or properties which are described, or described as preferred, in connection with the present invention for the coating composition of the invention are in each case also valid correspondingly or in the same sense for the uses thereof in accordance with the invention, for processes of the invention, for coated molds or cores of the invention, and for kits of the invention.

Where coating compositions of the invention, uses in accordance with the invention, processes of the invention, coated molds or cores of the invention, and kits of the invention which "comprise" or "contain" more closely identified embodiments, constituents or features are described below, the intention is that the corresponding variant, to be understood in a narrower scope, of the said coating compositions, uses, processes, coated molds or cores, or kits is in each case also intended to be disclosed, said variant "consisting" of these embodiments, constituents or features defined more closely in each case.

In accordance with the invention the primary object and further above-indicated aspects of the general object are achieved by means of a coating composition comprising (a) an aqueous phase having a pH of at most 5, preferably at most 4, (b) particulate, amorphous silicon dioxide, and (c) one or more further refractories, for producing a coating on a waterglass-bound mold or a waterglass-bound core, for use in the foundry. The primary object is also achieved by the corresponding use of the coating composition for producing a coating on a waterglass-bound mold or on a waterglass-bound core, for use in the foundry.

Without any assurance of correctness, it is thought that where the aqueous coating composition of the invention is used accordingly, while the water fraction of the coating composition does mean that binding structures in the alkali metal silicate framework of the waterglass-bound, coated foundry molding element (mold or core) are attacked, a further chemical reaction, such as an acid-base reaction, in the presence of the particulate, amorphous silicon dioxide, results in resultant weakenings of the binding structure that are possibly temporarily being eliminated again, with the ultimate outcome of an increased strength on the part of such coated, waterglass-bound foundry molding elements by comparison with the prior art.

For the purposes of the present invention, the pH value in a coating composition of the invention is determined in each case from the suspension, preferably by the standard method DIN 19260:2012-10.

The term "particulate, amorphous silicon dioxide" refers in the context of the present invention to particulate synthetic silicon dioxide, preferably precipitated silica and/or fumed silica. The use of a fumed silica is preferred.

For the purposes of the present invention, the particulate, amorphous silicon dioxide (constituent (b)) does not count as part of the "further" refractories of the constituent (c).

Precipitated silica is known per se and can be obtained, for example, in a manner known per se by reaction of an aqueous alkali metal silicate solution with mineral acids: the resultant precipitate is subsequently separated off, dried and, where appropriate, ground. Fumed silicas are likewise known per se and can be obtained preferably in a manner known per se at high temperatures by coagulation from the gas phase. Fumed silica may be produced, for example, by flame hydrolysis of silicon tetrachloride or, for the purposes of the present invention, preferably in an arc furnace by reduction of silica sand with coke or anthracite to form silicon monoxide gas, with subsequent oxidation to form silicon dioxide. A further form of amorphous, particulate silicon dioxide preferred in accordance with the invention is obtained during the production of zirconium dioxide. A further possibility, known per se, for the production of particulate amorphous silicon dioxide is the spraying of a silicon dioxide melt: the primary, amorphous silicon dioxide particles in this case are formed (as in other preferred production processes as well) not by a grinding operation.

After the production operations identified above, the primary amorphous silicon dioxide particles ("primary particles") are frequently in agglomerated form, i.e., are present as agglomerates of primary particles. The particle shape of the primary particles of the particulate, amorphous silicon dioxide is preferably spherical. The spherical form of the primary particles may be observed for example by means of scanning electron microscopy. Preferably the primary particles of the particulate, amorphous silicon dioxide are spherical and possess a sphericity of 0.9 or more, determined by evaluation of two-dimensional microscope (preferably scanning electron microscope) images.

Preference as refractories (cf. constituent (c)) is given to one or more substances selected from the group consisting of quartz, aluminum oxide, zirconium dioxide, aluminum silicates, phyllosilicates, zirconium silicates, olivine, talc, mica, graphite, coke, feldspar, diatomite, kaolins, calcined kaolins, metakaolinite, iron oxide, and bauxite.

The coating composition of the invention is particularly suitable for producing a coating on a waterglass-bound mold or on a waterglass-bound core, preferably on waterglass-bound molds or cores which comprise at least a fraction of particulate, amorphous silicon dioxide.

Waterglass-bound molds and cores, including those which comprise particulate amorphous silicon dioxide (as well as conventional mold base materials), and their production, are known per se, from, for example, the documents WO 2006/024540 and WO 2009/056320. The aforesaid molds and cores that are known per se are suitable for the purposes of the present invention.

Preferred is a coating composition of the invention where the primary particles of the particulate, amorphous silicon dioxide of constituent (b) (i) are spherical and/or (ii) possess a D90<10 μm, preferably <1 μm, determined by laser diffraction. Preferably the primary particles of the particulate, amorphous silicon dioxide of constituent (b) (i) are spherical and possess a sphericity of 0.9 or more, determined by evaluation of two-dimensional microscope images. Modern commercial electron or light microscope systems enable digital image analysis and therefore a convenient determination of the particle form. Digital image analysis is preferred for studies of the sphericity.

Preferred is a coating composition of the invention where the constituent (c) comprises one or more substances selected from the group consisting of quartz, aluminum oxide, zirconium dioxide, aluminum silicates, phyllosilicates, zirconium silicates, olivine, talc, mica, graphite, coke, feldspar, diatomite, kaolins, calcined kaolins, metakaolinite, iron oxide, and bauxite,
and/or
where the constituent (a) comprises one or more acids, preferably having a pKa<5, more preferably having a pKa<4, which are selected from the group consisting of inorganic and organic acids,
  where the inorganic acids are preferably selected from the group consisting of mono-, di-, and tricarboxylic acids, preferably mono-, di-, and tricarboxylic acids which are solid at 25° C. and 1013 mbar, more preferably citric acid and oxalic acid,
and/or
  where the inorganic acids are preferably selected from the group consisting of hydrochloric acid, nitric acid, and phosphoric acid,
and/or
comprising in or as constituent (b) a particulate, amorphous silicon dioxide which as a secondary constituent comprises (i) zirconium dioxide, (ii) carbon and/or (iii) a Lewis acid, preferably zirconium dioxide,
and/or
where the aqueous phase (a) has a pH of at most 4.

The "090" of the primary particles of the particulate, amorphous silicon dioxide denotes their particle size distribution. The particle size distribution is determined in a manner known per se by laser diffraction, preferably by the standard method according to DIN ISO 13320:2009-10. D90 values ascertained here for the cumulative frequency distribution of the volume-averaged size distribution function indicate that 90 vol % of the primary particles have a particle size which is the same as or less than the specified value (e.g. 10 μm). Suitable instruments for determining the particle size distribution are laser diffraction instruments known per se, of the "Mastersizer 3000" type from Malvern, United Kingdom, for example, preferably of the "Coulter LS 230" type from Beckman Coulter, USA, the measurement being performed preferably by means of the "Polarization Intensity Differential Scattering" ("PIDS") technology. With the aforesaid laser diffraction techniques, the scattered light signals are evaluated in each case preferably according to the Mie theory, which also takes account of the refraction and absorption behavior of the primary particles.

Where the primary particles of the particulate, amorphous silicon dioxide are present as agglomerates and/or aggregates and/or otherwise as associations of a plurality of primary particles, these are preferably separated gently by mechanical means or similarly in a manner known per se before the particle size distribution of the primary particles is determined, in order as far as possible to rule out distortion of the result.

The term "secondary constituent" denotes in the context of the present invention that the particulate, amorphous silicon dioxide of constituent (b) includes such secondary constituents only in small amounts which may originate, for instance, as impurities or adherences from upstream production and/or processing procedures on the particulate, amorphous silicon dioxide. Said secondary constituents are present preferably in an amount of not more than 18 wt % (or mass fraction), more preferably in an amount of not more than 12 wt %, most preferably in an amount of not more than 8 wt %, based in each case on the total mass of the particulate amorphous silicon dioxide of the constituent (b).

One of the aforesaid secondary constituents in the constituent (b) may be a Lewis acid. However, it is also possible for two or more Lewis acids and/or mixtures thereof to be included. A "Lewis acid" in the context of the present invention is an acid according to the approach proposed by G. N. Lewis, whereby an acid is an electron pair acceptor, i.e., a molecule or ion with incomplete noble-gas configuration, which is able to accept an electron pair provided by a Lewis base and to form with said base a so-called Lewis adduct. A Lewis acid is electrophilic, whereas a Lewis base is nucleophilic. Consequently, molecules and ions which according to the conventional notions are not acids may also be interpreted as acids.

Preference is given, furthermore, to a coating composition of the invention or preferred coating composition of the invention comprising one or more or all of the following constituents:
  one or more biocides,
  one or more wetting agents,
  one or more rheological additives, and
  one or more binders, preferably polyvinyl alcohol.

Suitable biocides include customary biocides such as microbicides, especially bactericides, algicides and/or fungicides. The biocides indicated above may preferably be used. Suitable wetting agents are preferably the wetting agents recited above. Suitable rheological additives are preferably the rheological additives recited above. Suitable binders are preferably the binders recited above. Polyvinyl alcohol is a particularly preferred binder.

Likewise preferred is a coating composition of the invention or preferred coating composition of the invention, where the ratio of the total mass of inorganic and organic acids in the aqueous phase (a) in relation to the total mass of the coating composition is in the range from 0.1 to 10%, preferably in the range from 1 to 5%, preferably in the range from 2.5 to 3.5%, and/or
where the ratio of the mass of the water to the total mass of the aqueous phase of constituent (a) is greater than 50%, preferably greater than 70%, more preferably greater than 90%,
and/or
where the coating composition possesses a solids content of less than 80 wt %, preferably less than 45 wt %, based on the total mass of the coating composition,
and/or
where the coating composition possesses a fraction of particulate, amorphous silicon dioxide of constituent (b) in the range from 1 to 30 wt %, preferably 5 to 20 wt %, more preferably 8 to 17 wt %, based on the total mass of the coating composition
and/or
where the coating composition possesses a total fraction of particulate, amorphous silicon dioxide of constituent (b) and of further refractories of constituent (c) in the range from 25 wt % to 80 wt %, preferably 30 to 60 wt %, more preferably 45 to 55 wt %, based on the total mass of the coating composition.

The solids content in coating compositions of the invention is determined in the context of the present invention preferably in accordance with data sheet P79 from the Verein Deutscher Gießereifachleute in the version of March 1976, section 6.

A further preferred embodiment is a coating composition of the invention or preferred coating composition of the invention comprising one or more binders, preferably comprising polyvinyl alcohol, in a total amount of not more than 2 wt %, preferably in an amount in the range from 0.05 to 0.80 wt %, based on the total mass of the coating composition.

The coating composition of the invention or for use in accordance with the invention is preferably ready to use, meaning that it is intended for immediate application to a casting mold or to a core. Alternatively, the coating composition of the invention or for use in accordance with the invention may take the form of a concentrate, in which case it is then intended for dilution, in particular by addition of water or an aqueous mixture, before being applied to a casting mold or to a core. This applies to all embodiments of the present invention unless otherwise indicated or specified. In each individual case the skilled person decides whether a coating composition is ready to use or ought additionally to be diluted.

A further subject of the present invention is the use of an above-described coating composition of the invention, including its embodiments specified as being preferred, for producing a coating on a waterglass-bound mold or on a waterglass-bound core, for use in the foundry.

All aspects indicated for the coating composition of the invention, especially the preferred features and combinations of features thereof, are also applicable mutatis mutandis to the (or to all) use(s) in accordance with the invention of the coating composition of the invention.

In a preferred embodiment of this use in accordance with the invention, the coating is produced on the waterglass-bound mold or the waterglass-bound core by an application process selected from the group consisting of spraying, dipping, flow coating, and spreading, preferably dipping.

Likewise preferred is an above-specified use in accordance with the invention or a preferred use in accordance with the invention where the waterglass-bound mold or the waterglass-bound core comprises particulate, amorphous silicon dioxide (preferably as well, for example, as one or more conventional mold base materials)
and/or
where the coating composition is applied to a waterglass-bound mold or a waterglass-bound core for use in the casting of iron or steel
and/or
where the coating composition is applied to a waterglass-bound mold or a waterglass-bound core for use in the casting of a metal melt with a temperature >900° C., preferably >1250° C., preferably for use in the casting of a metal melt comprising iron and/or steel,
and/or
where the coating composition is applied to a waterglass-bound mold or a waterglass-bound core at a temperature of the waterglass-bound core or the waterglass-bound mold of >50° C., preferably >70° C., more preferably at a temperature <100° C. Surprisingly under these conditions the resulting mold or resulting core which forms or remains under these conditions can be used for subsequent working and/or processing steps.

A further subject matter of the invention is the use of particulate, amorphous silicon dioxide in a coating composition, preferably in a coating composition as disclosed above as in accordance with the invention and/or as preferred in accordance with the invention, comprising
(a) an aqueous phase having a pH of at most 5, preferably of at most 4, and
(c) one or more further refractories,
for increasing the storage stability of the coating composition.

Subject matter of the invention is likewise the use of particulate, amorphous silicon dioxide in a coating composition, preferably in a coating composition as disclosed above as in accordance with the invention and/or as preferred in accordance with the invention, comprising
(a) an aqueous phase having a pH of at most 5, preferably of at most 4, and
(c) one or more further refractories,
as a means for reducing the detrimental effect, due to the coating with the water-containing refractory coating, on the flexural strength of a waterglass-bound core or waterglass-bound mold. Preferably, the waterglass-bound core or the waterglass-bound mold comprises particulate, amorphous silicon dioxide.

In the context of the present invention, a "high flexural strength" means a flexural strength on the part of a foundry molding element, preferably a core or a mold, which allows the foundry molding element to be handled practically without said element shattering.

A further subject of the invention is also a process for producing a waterglass-bound mold coated with a water-containing refractory coating, preferably such a mold having a high flexural strength, or a waterglass-bound core coated with a water-containing refractory coating, preferably such a core having high flexural strength, for use in the foundry, comprising the following steps:
(1) providing or producing a coating composition as disclosed above as in accordance with the invention and/or as preferred in accordance with the invention,
(2) providing or producing an uncoated, waterglass-bound mold or an uncoated, waterglass-bound core, and
(3) applying the provided or produced coating composition from step (1) to the provided or produced mold or the provided or produced core.

Preference is given to a process of the invention where the provided or produced uncoated mold or the provided or produced uncoated core comprises particulate, amorphous silicon dioxide,
and/or
where the uncoated, waterglass-bound mold or uncoated, waterglass-bound core is produced in step (2) by curing of a provided or produced molding material mixture
by gassing with carbon dioxide,
by admixing esters or phosphates
or
by gassing with hot air in a heated tool.

The above-specified processes for curing a provided or produced molding material mixture are known per se. As phosphates suitable for the curing it is possible for example to use aluminum phosphates.

The coating composition produced or provided in step (1) of the process of the invention may be produced by processes that are known per se. For example, water in suitable quantity can be introduced initially and the further constituents for producing the coating composition can then be added each in a desired amount to this initial charge with stirring using a suitable stirrer such as a high-shear stirrer, as for example a toothed-wheel stirrer or a dissolver stirrer. If necessary, constituents may be incorporated in a conventional way before or during the addition. Thus, for example, optionally, one or more rheological additives may be incorporated using a high-shear stirrer, before or after addition to the initial water charge and individually or together with one or more refractories. If the one or more refractories are not incorporated together with any added rheological additives, they may also be incorporated individually and added to the initial water charge. After that, for example the further constituents of the coating composition may be added to the initial water charge—optionally comprising rheological additives and/or refractories—in any order and preferably with stirring, preferably using a high-shear stirrer, as for instance one or more acids, one or more refractory coating binders, optionally one or more biocides, optionally one or more wetting agents, optionally one or more defoamers, optionally one or more pigments and/or one or optionally more dyes.

The coating composition produced or provided in step (1) of the process of the invention may be ready for use for application to foundry molding elements, hence being present, for example, in a concentration suitable for use as a dipping bath for molds or cores. It is also possible for the aforesaid coating composition, also in a conventional way, first to be produced as a concentrate, which only later, as for example just shortly before the use of the coating composition, is diluted by means, for example, of further addition of water, to a ready-to-use concentration (or consistency) which is then suitable for application to molds and/or cores. If quantities or conditions are stated in the context of the present invention with regard to the coating composition of the invention or coating composition used in accordance with the invention, the coating composition referred to in each case is ready to use (being intended for immediate application to a casting mold or to a core) unless expressly stated otherwise. In general it is not necessary to mix the individual constituents of the coating composition of the invention, or coating composition for use in accordance with the invention, with one another only immediately before an as-intended coating operation onto molds or cores; instead, mixing may take place at a very much earlier stage, because the storage stability of the coating composition of the invention or for use in accordance with the invention is high.

The uncoated, preferably waterglass-bound, mold provided or produced, or the uncoated, preferably waterglass-bound, core provided or produced, in step (2) of the process of the invention may be produced in a conventional way, as for example as described in documents WO 2006/024540 or WO 2009/056320.

The applying in step (3) of the provided or produced coating composition from step (1) to the provided or produced mold or the provided or produced core may take place, according to step (2) of the process of the invention, in a manner known per se, preferably by the application methods indicated above as being suitable, more preferably by dipping of the mold or the core in a coating composition of the invention or coating composition used in accordance with the invention, provided as a dipping bath.

Likewise preferred is a process of the invention or preferred process of the invention where the applying to the provided or produced uncoated mold or the provided or produced uncoated core takes place at a temperature of the provided or produced mold or provided or produced core of >50° C., preferably >70° C., more preferably at a temperature <100° C.,
and/or
where the applying to the provided or produced uncoated mold or the provided or produced uncoated core takes place by an application process selected from the group consisting of spraying, dipping, flow coating, and spreading, preferably dipping.

The present invention also has as subject matter a coated, waterglass-bound mold or a coated, waterglass-bound core for use in the foundry, comprising a coating composition as described above as in accordance with the invention and/or preferred in accordance with the invention.

Preferably, said mold and said core are producible by a process as described above as in accordance with the invention and/or as preferred in accordance with the invention, for producing a waterglass-bound mold coated with a water-containing refractory coating or a waterglass-bound core coated with a water-containing refractory coating.

Further preferred is a coated mold of the invention of this kind or a coated core of the invention of this kind, where the waterglass-bound mold or the waterglass-bound core in each case comprises particulate, amorphous silicon dioxide.

Likewise a subject of the present invention is an aforesaid coated mold of the invention and/or a coated mold preferred according to the invention or an aforesaid coated core of the invention and/or coated core preferred according to the invention for use in the casting of a metal melt having a temperature >900° C., preferably >1250° C., preferably for use in the casting of a metal melt comprising iron and/or steel.

A further subject of the invention is also a kit including in separate components
(U) an above-described coating composition of the invention and/or coating composition preferred according to the invention for producing a coating on a waterglass-bound mold or a waterglass-bound core, for use in the foundry,
(V) a binder comprising waterglass, and
(W) particulate, amorphous silicon dioxide.

It has been found that the coating composition of the invention exhibits and/or substantiates in particular the following advantages over comparable coating compositions known from the prior art:
an improved strength of the coated molds and/or cores producible therewith, especially of the coated inorganically bound molds and/or cores producible therewith, preferably of the waterglass-bound molds and/or cores producible therewith;

an improved storage stability of the coated molds and/or cores producible therewith, especially of the coated inorganically bound molds and/or cores producible therewith, preferably of the waterglass-bound molds and/or cores producible therewith;

an improved atmospheric moisture resistance of the coated molds and/or cores producible therewith, especially of the coated inorganically bound molds and/or cores producible therewith, preferably of the waterglass-bound molds and/or cores producible therewith;

an improved possibility for application to hot molds and/or cores (i.e. preferably to those cores and/or molds which have temperatures of more than 50° C., preferably temperatures in the range from 50 to 100° C.)—by means of this property it is possible, for example, to enable a more rapid working sequence in mass fabrication and ideally a higher piece rate per unit time; and/or an improved possibility for use of inorganically bound, especially waterglass-bound, foundry molding elements, more particularly of molds and/or cores, for the casting of iron and/or steel, by corresponding use of the refractory coatings of the invention.

These advantages are valid mutatis mutandis for the other subjects and aspects of the present invention.

EXAMPLES

The examples given below are intended to describe and explain the invention in more detail without limiting its scope.

Example 1: Production of Coating Compositions

The inventive coating composition indicated in Table 1 ("SZ1") and also the noninventive, comparative coating compositions ("SZ2" and "SZ3") were produced in a conventional way by mixing the respectively indicated ingredients:

For this purpose in each case the required amount of water was introduced initially in a glass beaker (batch size in each case around 2 kg of coating composition as "concentrates", cf. Table 1), the rheological additives and the refractories (phyllosilicates, zircon flour, graphite) were added, and these ingredients were then incorporated in a conventional way using a high-shear dissolver stirrer for 3 minutes. The other constituents of the coating compositions (cf. Table 1) were then added in the proportions indicated, followed by stirring for a further 2 minutes with a high-shear dissolver stirrer. This gave the dilutable refractory coating-composition concentrates indicated in Table 1 in each case.

The references to "DIN grinds" in Table 1 denote that the respectively indicated constituent of the coating composition is present in the ground state and, after the sieving of a sample of this constituent with an analytical sieve having a nominal mesh size in μm corresponding to the stated numerical value (e.g.: "80" denotes "analytical sieve with mesh size 80 μm") (according to DIN ISO 3310-1:2001-09), a residue remains in each case that is in the range from 1 to 10 wt %, based on the amount of sample used.

TABLE 1

Inventive and noninventive coating compositions (each obtained as dilutable "concentrates")

| Coating compositions: ("concentrates") Ingredients: | SZ1 [wt %] | SZ2 [wt %] | SZ3 [wt %] |
|---|---|---|---|
| Water | 43.3 | 47.1 | 46.0 |
| Rheological additive | 1.5 | 1.5 | 5.0 |
| Phyllosilicate (pyrophyllite DIN 140 grind) | ./. | 11.0 | 26.0 |
| Phyllosilicate (mica DIN 160 grind) | 12.0 | 18.0 | ./. |
| Zircon flour (zirconium silicate, DIN 60 grind) | 13.5 | 10.0 | 9.0 |
| Graphite (DIN 80 grind) | 11.0 | 11.0 | 8.0 |
| Polyvinyl acetate | ./. | ./. | 0.9 |
| Polyvinyl alcohol | 0.4 | 0.4 | ./. |
| Biocide (benzisothiazolinone, 10% w/w aqueous solution) | 0.3 | 0.3 | 0.3 |
| Modified starch | ./. | ./. | 0.3 |
| Yellow iron oxide | ./. | ./. | 1.2 |
| Wetting agent | 0.6 | 0.6 | 0.3 |
| Defoamer | 0.1 | 0.1 | ./. |
| Propylene carbonate | ./. | ./. | 3.0 |
| Particulate, amorphous silicon dioxide | 14.3 | ./. | ./. |
| Citric acid | 3.0 | ./. | ./. |
| TOTAL: | 100.0 | 100.0 | 100.0 |

"./.": containing no fraction;

The dilutable refractory coating-composition concentrates indicated in Table 1 above were subsequently diluted with water to produce coating compositions ready for use for the purpose intended here (for application to molds and/or cores by means of a dipping operation, preferably in the form of a dipping bath). The respective dilution employed and also other properties of the ready-to-use coating compositions resulting in each case from the dilution employed are indicated below in Table 1a:

TABLE 1a

Production and properties of ready-to-use (for dipping bath or dipping tank) coating compositions

| Coating compositions (ready to use for dipping tank or dipping bath): | SZ1 | SZ2 | SZ3 |
|---|---|---|---|
| Concentrate (as per Table 1), parts by weight: | 100.0 | 100.0 | 100.0 |
| Water, parts by weight | 30.0 | 40.0 | 30.0 |
| Properties of the ready-to-use coating compositions resulting from the above dilution: | | | |
| Density [g/ml] | 1.32 | 1.35 | 1.36 |
| Flow time [s] | 13.4 | 13.3 | 13.7 |
| pH | 2.1 | 6.7 | 7.2 |

As is apparent from Table 1a, the coating compositions for the purpose intended here, application to test cores by means of a dipping application or a dipping bath, were produced in such a way as to ensure easy comparability (i) of their respective properties on application to the test cores and also (ii) of the respectively resulting properties of the coated test cores (densities and flow times were set to be as similar as possible); but differing pH for inventive coating composition SZ1 relative to noninventive coating compositions SZ2 and SZ3).

The densities of the ready-to-use coating compositions, indicated in Table 1a, were measured according to the standard test method DIN EN ISO 2811-2:2011 (method A).

The flow times of the ready-to-use coating compositions, indicated in Table 1a, were measured according to the standard test method DIN 53211 (1974) by determination with the DIN 4 cup.

The pH values of the ready-to-use coating compositions, indicated in Table 1a, were measured in accordance with the standard test method DIN 19260:2012-10 in each case from the suspension.

The coating compositions SZ1 and SZ2 each contained attapulgite as rheological additive. Coating composition SZ3 is of the type described in document WO00/05010.

Example 2: Investigation of the Softening of Foundry Cores

To determine the softening of foundry cores (i.e., the maximum drop in flexural strength), "test cores" (test specimens) were produced conventionally (in accordance with the "core system 1" indicated in Table 4) in a core shooting machine from Multiserw (model LUT, gassing pressure: 2 bar, shot time: 3.0 s; shooting pressure 4.0 bar). An hour after core production, the test cores were coated with the above-stated ready-to-use coating compositions "SZ1", "SZ2" and "SZ3" (cf. Table 1a) at room temperature (25° C.) by dipping (conditions: 1 s immersion; 3 s hold time in the coating composition, 1 s removal). The wet film thickness of the refractory coatings was adjusted in each case to about 250 μm. Thereafter the coated test cores were dried in a forced-air oven (1 hour at 120° C.), and the change in their flexural strengths under the drying conditions was investigated.

The coated test cores were each dried over a period of an hour, during which their flexural strengths (in N/cm$^2$, corresponding to the definition as indicated in data sheet R 202 of the Verein Deutscher GieRereifachleute, October 1978 edition) were measured at different times during the drying and then once more one hour after the end of the drying operation using a standard testing instrument of the type "Multiserw-Morek LRu-2e", in each case with a standard measurement program "Rg1v_B 870.0 N/cm$^2$" (3-point bending strength).

Table 2, for the coated test cores investigated, reports in each case the values for the maximum dropping of flexural strength within the stated time under drying conditions, in %, based in each case on the flexural strength of the respective freshly coated (still wet) test core before the start of drying (initial value).

TABLE 2

Drop in strength of coated test cores under drying conditions

| Type of refractory coating on test core | Maximum drop in flexural strength on drying, as % of the initial value | Observation of core failure during drying |
|---|---|---|
| SZ 1 | 90 | No |
| SZ 2 | 0 | Yes |
| SZ 3 | 25 | No |

The expression "core failure" denotes here and below in each case the invalidation of a coated core during the drying procedure, meaning that the coated core was in each case unusable for the measurement of flexural strength and also for a subsequently envisaged casting procedure.

From the values reported in Table 2 it can be seen, among other things, that the maximum drop in the flexural strength of a test core coated with an inventive coating composition (SZ1) is significantly smaller than with a noninventive, comparative composition (SZ2 and SZ3). It is further apparent from the values in Table 2 that with the noninventive, comparative coating composition SZ2 it was not possible under the selected conditions to produce any usable coated cores.

Example 3: Investigation of the Storage Stability of Coated and Uncoated Foundry Cores To determine the storage stability, waterglass-bound test cores (test specimens) were produced in a conventional way (analogous to Example 2) and their flexural strengths were determined in each case uncoated, shortly after their production (one hour storage time, relative humidity in the range from 30 to 60%, temperature in the range from 20 to 25° C.) as indicated above; cf. Table 3 (entry "uncoated after 1 h").

Furthermore, corresponding test cores were coated as indicated below in Table 3 one hour after core production (i.e. after the same respective time interval from their production) at room temperature (25° C.) with the coating compositions SZ1 and SZ2, in each case by dipping (conditions: 1 s immersion; 3 s hold time in the coating composition, 1 s removal) (the coating compositions are designated as in Example 1) and then dried in each case for an hour at 120° C. in a forced-air oven. The coated, dried test cores were then subjected to a storage test for a duration of seven days (insofar as it was possible to produce the coated core or insofar as core failure was not observed before). The temperature during the storage was in each case 35° C.; the relative humidity was in each case 75%. After the end of the storage test, the flexural strengths of the test cores were determined as indicated above. The results of these storage tests are reported below in Table 3. The test cores ("core system 1") used for all of the tests in Example 3 are cores whose production conditions are specified below in Table 4.

TABLE 3

Determination of the storage stability of coated and uncoated foundry cores

| Core system | Uncoated after 1 h | Coated with type SZ1 | Coated with type SZ2 | Uncoated on storage |
|---|---|---|---|---|
| | Flexural strength [N/cm$^2$] | | | |
| 1 | 300 | 119 | Not determinable | core failure after 131 min. |

From the values reported in Table 3 it can be seen, among other things, that a waterglass-bound test core coated with an inventive coating composition (SZ1) after seven-day storage reliably still had approx. 40% of the initial strength, whereas a test core coated with a noninventive, comparative coating composition (SZ2) was unusable under comparable conditions: its flexural strength was no longer determinable under the conditions defined above, since it fell apart during storage. Under the test conditions, an uncoated comparative core failed after just 131 min., i.e., just the application of an inventive coating composition to a test core resulted in the test core being stabilized under drying conditions.

TABLE 4

Production conditions for core system 1

| Parameter | Core system 1 |
|---|---|
| Molding material (100 parts by weight) | Silica sand |
| Binder (2.2 parts by weight) | Alkali metal waterglass solution, 25-35 wt % waterglass content in water (wt/wt) |
| Additive (1.0 part by weight) | Particulate, amorphous silicon dioxide |
| Core box temperature | 120° C. |
| Gassing temperature | 150° C. |
| Cure time | 30 s |

Core system 1 consisted only of the molding material, binder, and additive constituents, as indicated in Table 4:

The binder indicated in Table 4 for core system 1 was a commercial alkali metal waterglass binder "Cordis® 8511" (Huttenes-Albertus Chemische Werke GmbH).

The additive indicated in Table 4 for core system 1 was a commercial binder additive whose main constituent (≥95 wt %) was particulate, amorphous silicon dioxide, "Anorgit® 8396" (Huttenes-Albertus Chemische Werke GmbH).

Example 4: Investigation of the Flexural Strengths of Coated Foundry Cores

Waterglass-bound test cores (test specimens) were produced in a conventional way (analogous to that described in Example 2, but after interim maintenance of the core shooting machine used) and their flexural strengths were determined for comparative purposes in each case uncoated, shortly after their production (one hour storage time at a temperature in the range from 20 to 25° C., relative humidity 30 to 60%) as indicated above (for the production conditions of the test cores, see Table 6).

Furthermore, test cores as indicated below in Table 5 were coated at different core temperatures by dipping (conditions: 1 s immersion; 3 s hold time in the coating composition, 1 s removal) (designation of the coating compositions as in Example 1) and dried in each case in a forced-air oven at 120° C. for an hour. After cooling to room temperature and a storage time of 24 hours (relative humidity in the range from 30 to 60%, temperature in the range from 20 to 25° C.), the flexural strengths were then determined as indicated above on the coated, dried test cores.

The results of the determinations of the flexural strengths are reported below in Table 5. In this case, two different test cores ("core system A" and "core system B") were used, the production conditions for each of which are reported below in Table 6. The inventive coating composition SZ1 here was also applied to test cores which had different temperatures (25° C., 50° C., and 90° C., respectively).

TABLE 5

Determination of the flexural strengths of coated foundry cores

| | Uncoated after 1 h | Coated with type SZ1 | Coated with type SZ1 | Coated with type SZ1 | Coated with type SZ2 |
|---|---|---|---|---|---|
| Core temperature | 25° C. | 50° C. | 90° C. | 25° C. | |
| Core system | Flexural strength [N/cm²] | | | | |
| A | 350 | 310 | 330 | 350 | production of a coated core not possible |
| B | 350* | 320 | not determined | not determined | production of a coated core not possible |

* Deviation in the measured value from the corresponding value in Table 3 for core system 1 is interpreted essentially as a consequence of the maintenance on the core shooting machine.

From the values reported in Table 5 it can be seen that foundry cores coated with inventive coating compositions at different core temperatures achieve high flexural strengths. In particular the values reported in Table 5 show that with inventive coating compositions foundry cores can be coated successfully even at relatively high temperatures, for instance at temperatures in the range from 50 to 100° C. With a noninventive, comparative coating composition (SZ2), on the other hand, under comparable conditions, it was not possible to produce a usable core, this core instead failing in the course of drying.

TABLE 6

Production conditions for core systems A and B

| Parameter | Core system A | Core system B |
|---|---|---|
| Molding material | Silica sand (100.0 parts by weight) | Silica sand (100.0 parts by weight) |
| Binder | Alkali metal waterglass solution, 25-35 wt % waterglass content in water (wt/wt) (2.2 parts by weight) | Alkali metal waterglass solution, 25-35 wt % waterglass content in water (wt/wt) (2.2 parts by weight) |
| Additive | Particulate, amorphous silicon dioxide (1.0 part by weight) | Particulate, amorphous silicon dioxide (1.0 part by weight) |
| Core box temperature | 120° C. | 120° C. |
| Gassing temperature | 150° C. | 150° C. |
| Cure time | 50 s | 30 s |

The core systems A and B were produced in an identical manner from the identical constituents, with the exception of the different curing times.

The binders and additives indicated for the core systems A and B in Table 6 corresponded in each case to the binders ("Cordis® 8511") and additives ("Anorgit® 8396") indicated in relation to Table 4.

The above-stated core systems A, B and C consisted in each case only of the molding material, binder and optionally additive constituents, as indicated in Table 6.

The invention claimed is:

1. A coating composition comprising
   (a) an aqueous phase having a pH less than 4.5,
   (b) particulate, amorphous silicon dioxide, and
   (c) one or more further refractories,
   for producing a coating on a waterglass-bound mold or a waterglass-bound core, for use in the foundry, where the coating composition possesses a fraction of particulate, amorphous silicon dioxide of constituent (b) in the range from 1 to 18 wt %, and where the constituent (c) comprises one or more substances selected from the group consisting of quartz, aluminum oxide, zirconium dioxide, aluminum silicates, phyllosilicates, zirconium silicates, olivine, talc, mica, graphite, coke, feldspar, diatomite, kaolins, calcined kaolins, metakaolinite, iron oxide, and bauxite, wherein the particulate, amorphous silicon dioxide comprises primary particles and the primary particles of the particulate, amorphous silicon dioxide of constituent (b) possess a D90 ranging from 1 μm to 10 μm, determined by laser diffraction.

2. The coating composition as claimed in claim 1, where the primary particles of the particulate, amorphous silicon dioxide of constituent (b) are spherical.

3. The coating composition as claimed in claim 1, where the constituent (a) comprises one or more acids having a pKa <5, which are selected from the group consisting of inorganic and organic acids.

4. The coating composition as claimed in claim 1, comprising one or more or all of the following constituents:
one or more biocides,
one or more wetting agents,
one or more rheological additives, and
one or more binders.

5. The coating composition as claimed in claim 3,
where the ratio of the total mass of inorganic and organic acids in the aqueous phase (a) in relation to the total mass of the coating composition is in the range from 0.1 to 10%, or
where the ratio of the water to the total mass of the aqueous phase of constituent (a) is greater than 50%, or
where the coating composition possesses a solids content of less than 80 wt %, based on the total mass of the coating composition, or
where the coating composition possesses a fraction of particulate, amorphous silicon dioxide of constituent (b) in the range from 5 to 18 wt %, based on the total mass of the coating composition or
where the coating composition possesses a total fraction of particulate, amorphous silicon dioxide of constituent (b) and of further refractories of constituent (c) in the range from 25 wt % to 80 wt %, based on the total mass of the coating composition.

6. The coating composition as claimed in claim 1, comprising one or more binders based on the total mass of the coating composition.

7. The coating composition as claimed in claim 2, where the primary particles of the particulate, amorphous silicon dioxide of constituent (b) possess a sphericity of 0.9 or more, determined by evaluation of two-dimensional microscope images.

8. The coating composition as claimed in claim 3,
where the organic acids are selected from the group consisting of mono-, di-, and tricarboxylic acids, which are solid at 25° C. and 1013 mbar, and/or
where the inorganic acids are selected from the group consisting of hydrochloric acid, nitric acid, and phosphoric acid, and/or comprising in or as constituent (b) a particulate, amorphous silicon dioxide which as a secondary constituent comprises (i) zirconium dioxide, (ii) carbon and/or (iii) a Lewis acid.

9. The coating composition as claimed in claim 6, wherein the one or more binders comprises polyvinyl alcohol.

* * * * *